Sept. 23, 1969 M. CAMRAS 3,469,037

MAGNETIC TRANSDUCER HEAD WITH SINGLE RECORD WINDING AND PLURAL REPRODUCE WINDINGS

Filed Aug. 12, 1964 3 Sheets-Sheet 1

INVENTOR.

Marvin Camras

BY Hill, Sherman, Meroni, Gross & Simpson ATTORNEYS

INVENTOR.
Marvin Camras

BY Hill, Sherman, Meroni, Gross & Simpson ATTORNEYS

INVENTOR.
Marvin Camras

BY Hill, Sherman, Meroni, Gross & Simpson ATTORNEYS

United States Patent Office 3,469,037

Patented Sept. 23, 1969

3,469,037

MAGNETIC TRANSDUCER HEAD WITH SINGLE RECORD WINDING AND PLURAL REPRODUCE WINDINGS

Marvin Camras, Glencoe, Ill., assignor to IIT Research Institute, Chicago, Ill., a corporation of Illinois Filed Aug. 12, 1964, Ser. No. 389,021
Int. Cl. G11b 5/30
U.S. Cl. 179—100.2 2 Claims

ABSTRACT OF THE DISCLOSURE

A transducer head having two windings of a different number of turns, the winding of smaller number of turns being used alone for recording and both windings being used for reproducing.

CROSS REFERENCE TO RELATED APPLICATION

Reference is made to my copending application Ser. No. 344,075 filed Feb. 11, 1964, and the benefit of the filing date of this application is hereby claimed pursuant to 35 USC 120.

This invention relates to an electromagnetic transducer system and method for recording and/or reproducing electrical signals particularly both audio and video signals. Also, this invention relates to an improved magnetic transducer head for providing a high frequency bias field of optimum shape and characteristics in the effective recording region of the head.

In one type of magnetic recording apparatus, a lengthy magnetizable record medium, such as a tape having a magnetizable layer, is drawn across an electromagnetic transducer head assembly at substantially a uniform linear velocity. A preferred head assembly for such a system includes a magnetic core having a non-magnetic gap over which the medium passes and which is provided with suitable elements to produce a magnetic field across the gap which field varies in accordance with a first intelligence signal. A second form of intelligence may be impressed on the magnetizable record medium transverse and on either side of the first intelligence signal. This is accomplished by a second magnetic core so positioned and arranged as to provide two non-magnetic gaps over which the medium passes. The pole portions of the first core are preferably so positioned and arranged that the medium passes over first one pole and then across the gap and then over the other pole, while the pole portions of the second core are preferably so positioned and arranged that the medium simultaneously passes over the two transverse gaps.

The present invention is also concerned with a video playback system wherein the record medium travels at relatively high speeds and the video signal is recorded on each of a substantial number of narrow audio-video channels extending lengthwise of the direction of travel of the record medium. An embodiment in accordance with the present invention is capable of producing an hour or more of recording on a seven-inch reel of one-quarter inch wide magnetic record tape while avoiding the complexity and expense of a rotating type scanning head such as previously employed in the art.

During the recording operation, current is caused to flow in the exciting elements in accordance with the time variation of the intelligence to produce a time-varying magnetic field in the core. The lengthy magnetizable medium is subjected to an influence of this field as it is drawn therethrough, and magnetization is imparted to incremental lengths of the medium in accordance with the time variations of the intelligence, thus causing variations in the degree of magnetization of the medium along its length in accordance with the time variations of the intelligence. Also during recording of audio-video signals an appropriate high frequency biasing signal is preferably applied to the transducer head. A similar arrangement may however be used with direct current bias, or in special cases without bias.

During reproduction, the lengthy magnetizable medium is drawn across the same or a similar head assembly to set up a flux in the core member thereof in accordance with the degree of magnetization of the medium along successive incremental lengths as it is passed across the gap of the magnetic core. The resultant time varying flux induces a voltage in the coil or other flux sensitive means with which the flux is coupled. This voltage may be amplified and suitably reproduced to provide both video and audio intelligence required for the operation of a commercially available television set.

The present invention is also concerned with providing an electrical transducer head having a sufficiently broad frequency response as to enable a high degree of accuracy in the reproduction of video signals applied thereto. To realize full the advantages afforded by the electromagnetic transducer head, improved electronic circuitry is also provided. For example, the electromagnetic transducer head may be provided with a high frequency bias winding on either side of the non-magnetic gap used for recording video intelligence. Although other methods of providing high frequency signals to an electromagnetic transducer head are well known in the art, the method employed by the present invention allows a higher A.C. bias frequency than could otherwise be used which gives a lower noise level and avoids "beating" with the signal. This is of special advantage with video and other wide band recording. The head of the present invention shows a substantial savings in space and material while maintaining the same or better results than electromagnetic transducer heads constructed heretofore.

Since the electromagnetic transducer head is to be used in a recording system having a plurality of longitudinal channels impressed on the record medium, the head is advantageously provided with substantially symmetrical recording properties so that recording can take place in each direction of movement of the record medium across the head.

It is therefore an object of the present invention to provide a novel method and means for recording intelligence on a magnetizable record medium.

Another object of the present invention is to provide a novel electromagnetic transducer head.

Yet another object of the present invention is to provide a novel electromagnetic transducer head which is constructed and arranged so as to have an audio track on either side of the video track.

Another object of the present invention is to provide a novel means by which effective high frequency bias in the megacycle range can be applied to the transducer head to improve the characteristics of video recording. This means can also be used with heads or other lower frequency recordings, particularly to allow a very high frequency bias which is advantageous in achieving lowest noise levels.

Another object of the present invention is to provide a transducer head of improved symmetrical construction so as to be operable in either direction of travel of the record medium.

Still another object of the present invention is to provide an improved means for recording and playback of video signals having a wide frequency response.

Yet another object of the present invention is to provide novel means by which hum-bucking is provided during playback of the record medium.

A further object is to provide a playback head for television signals having a means for suppressing cross-talk between adjacent audio and video tracks.

A more specific object of the present invention is to provide an improved electromagnetic transducer head consisting of two or more magnetic cores, all of which lie in different planes and which may or may not have electromagnetic interaction therebetween.

A further more specific object of the present invention is to provide a novel electromagnetic transducer head in which the intelligence applied thereto may be received directly from a commercially available television set, and in which the playback signal from the transducer head may be applied to the same or a different commercially available television set.

A still further more specific object of the present invention is to provide an electromagnetic transducer head of improved characteristics for recording intelligence with high frequency components of a magnitude such as is required for proper reproduction on commercial television receivers and the like.

Other objects and features which I believe to be characteristic of my invention are set forth with particularity in the appended claims. My invention itself, however, both as to organization, manner of construction, and method of operation, together with further advantages and objects thereof, may best be understood by reference to the following description taken in connection with the accompanying drawings, in which:

FIGURE 1 illustrates a composite audio-video magnetic transducer head generally designated by reference numeral 10, and which is energized to produce a composite video and synchronizing track between two audio tracks on the record medium 11 as described hereinbelow.

Figure 1:
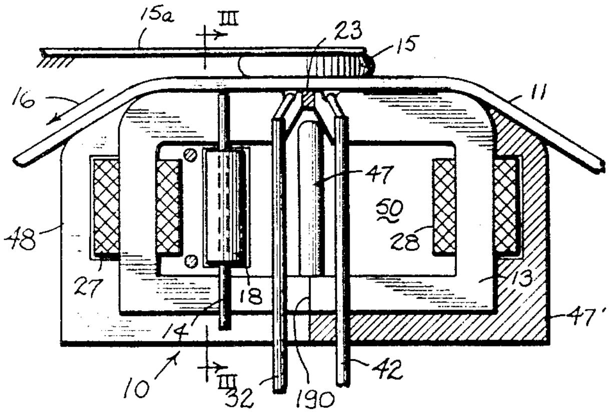
FIGURE 1 is a somewhat diagrammatic view of an electromagnetic transducer head with certain parts broken away and indicating an embodiment in accordance with the present invention.

The composite head is constructed and arranged so as to have an outer protective casing 12 surrounding the magnetic core members 13 and 14 and the electric windings thereon. The magnetic core member 14 is utilized for the recording and reproduction of the audio tracks and is provided with a pair of windings 17 and 18 which, by way of example, can have 1500 turns of conductive material each to provide an overall substantially flat frequency response over the audio frequency range. The non-magnetic gap spacers 20 and 21, FIGURE 2, which are disposed between the end portions 14*a* and 14*b* of the magnetic core 14 and portions of the side walls of the magnetic core 13 are so arranged as to produce an audio frequency record track of 2 mils width on either side of the magnetic core member 13. Holding the record medium 11 in movable contact with the transducer head 10 is a pressure pad 15 of resilient material which is movable toward and away from the transducer head by suitable mechanical or electromechanical means and in operative position is resiliently urged toward the head.

Provided between the polar portions of the magnetic core member 13 is a non-magnetic gap spacer 23. The gap defined by the gap spacer 23 provides a video signal track midway between the audio signal tracks. By way of example, the gap spacer 23 may have a dimension of 50 micro-inches in the direction of movement of the record medium.

The magnetic core member 13 has located thereon video frequency signal coils 27 and 28 which have different and overlapping frequency characteristics, thereby providing the broader frequency response required for video signals. By way of example, the coil 27 may comprise 1000 turns of conductive material while the coil 28 may comprise 200 turns of a similar conductive material, and one lead of each coil 27 and 28 may be connected together while the output signal is obtained from the other leads of the respective coils.

In the preferred embodiment, however, only the coil having 200 turns is used for recording video signals, while the coil having 200 turns together with the coil having 1000 turns are used in series for playback of the video signal. To further increase the frequency response of the transducer head during playback, coils 27 and 28 are connected so that their magnetic fields are opposing or bucking each other. In this manner, the coil 27 will provide an adequately strong signal output at the lower frequencies because the bucking of coil 28 is too small to appreciably affect the output of coil 27. However, at the high frequencies, above the resonance of coil 27 (with its own and with circuit capacitances), the phase of the output signal from the coil 27 is shifted by an amount approaching 180 degrees and thus adds to the output of the high frequency coil 28, which is below its own resonance at this higher frequency. If still a broader frequency response is required from the transducer head 10, a third coil may be added to the magnetic core 13, which may have fewer turns than coil 28 and which will also be assisted by the phase reversal of the coils resonant at lower frequencies. To still further increase the high frequency response of this transducer head 10, a ferrite shunt 47 may be placed centrally of the magnetic core 13 with one end thereof in proximity to the gap 23.

Figure 5:
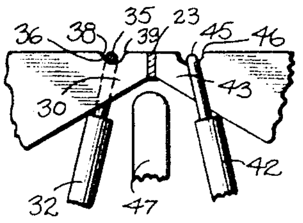
FIGURE 5 is an enlarged fragmentary view of the magnetic recording gap region of the head of FIGURE 1.

The transducer head 10 has extending along the opposite side walls of the pole piece 30, FIGURE 5, a pair of conductors 31 and 32, which are preferably No. 22 A.W.G. enamel coated conductors. Connected between the upper ends of conductors 31 and 32 is a No. 32 to No. 36 A.W.G. conductor 35, which is inserted into a recessed portion 36 of the pole piece 30. The conductor 35 has a diameter which is about 100 times the longitudinal dimension of the gap 23. The recessed portion 36 is provided with rounded edges 38 and 39 which serve to prevent unwanted recording fields due to the conductor 35 at the corners of the recessed portion 36. A pair of conductors 41 and 42 are provided along the side walls of the pole piece 43 and have connected between their upper portions a conductor 45, which is inserted into a groove 46 of the pole piece 43. The conductors 35 and 45 are preferably polished to give a continuous surface for the tape as indicated at 35*a* in FIGURE 5A.

The conductors 35 and 45 are symmetrically arranged on the pole pieces 30 and 43 in such a manner as to provide symmetrical recording characteristics in either direction of travel of the record medium. Also the conductors 35 and 45 can be arranged in such a manner as to allow the application of biasing currents of lower amplitude to both conductors 35 and 45 simultaneously while the record medium moves in either direction.

Figure 5A:
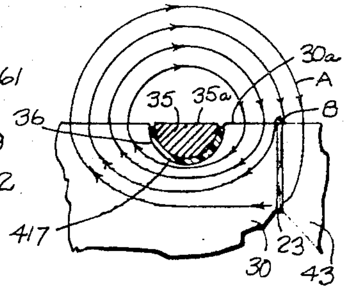
FIGURE 5A is a diagrammatic view showing preferred details of construction for the embodiment of FIGURE 5 and illustrating the magnetic field components produced by energization of one of the cross field conductors of FIGURE 5.

Preferably one or the other of conductors 35 or 45 is energized, depending on the direction of travel of the record medium, by a high frequency bias current which by way of example, may have an amplitude of approximately 1 ampere at a frequency between 3 and 15 megacycles; preferably a frequency is used which itself and the harmonics of which will not interfere with the operation of the television set. During one mode of operation, the conductor 35 may have generated thereabout a magnetic field which enters the pole piece 43 substantially at right angles thereto as indicated in FIGURE 5A. This establishes an arc shaped magnetic field in the region above the gap as indicated at A in FIGURE 5A, modified by a semicircular field of greater curvature due to the component of flux of the conductor which is carried by the core which traverses the gap, such as indicated at B in FIGURE 5A. The magnetic field generated by the intelligence signal to be recorded resembles the B component. Therefore a composite magnetic field is produced by both the bias magnetic field and the intelligence signal magnetic field. The composite magnetic recording field has a relatively sharp gradient as to the longitudinal bias frequency component thereof at the trailing side of gap 23. An alternative method for applying high frequency bias to the signal magnetic field is to introduce the high frequency signal to the video recording coils 27 and 28 and this component may be in addition to the field supplied by the conductor 35. If both fields are used it may be advantageous to select the polarity of the two components or to shift the phase of one with respect to the other.

The flux produced by the bias conductor 35 is preferably of a frequency at least several times that of the intelligence frequency. Alternatively, a direct current bias may be supplied to the conductor 35 and/or windings 27 and 28 so as to cause the video frequency component of the applied signal to be recorded on the relatively linear, positively sloping portion of the B*r* versus H curve of the magnetic material of the tape 11. In this case the tape may be presaturated before reaching the recording head. The high frequency bias for the audio portion of the transducer head 10 is obtained from the horizontal sweep generator of the television set and is applied directly to the audio coils 17 and 18.

Figures 6, 8:
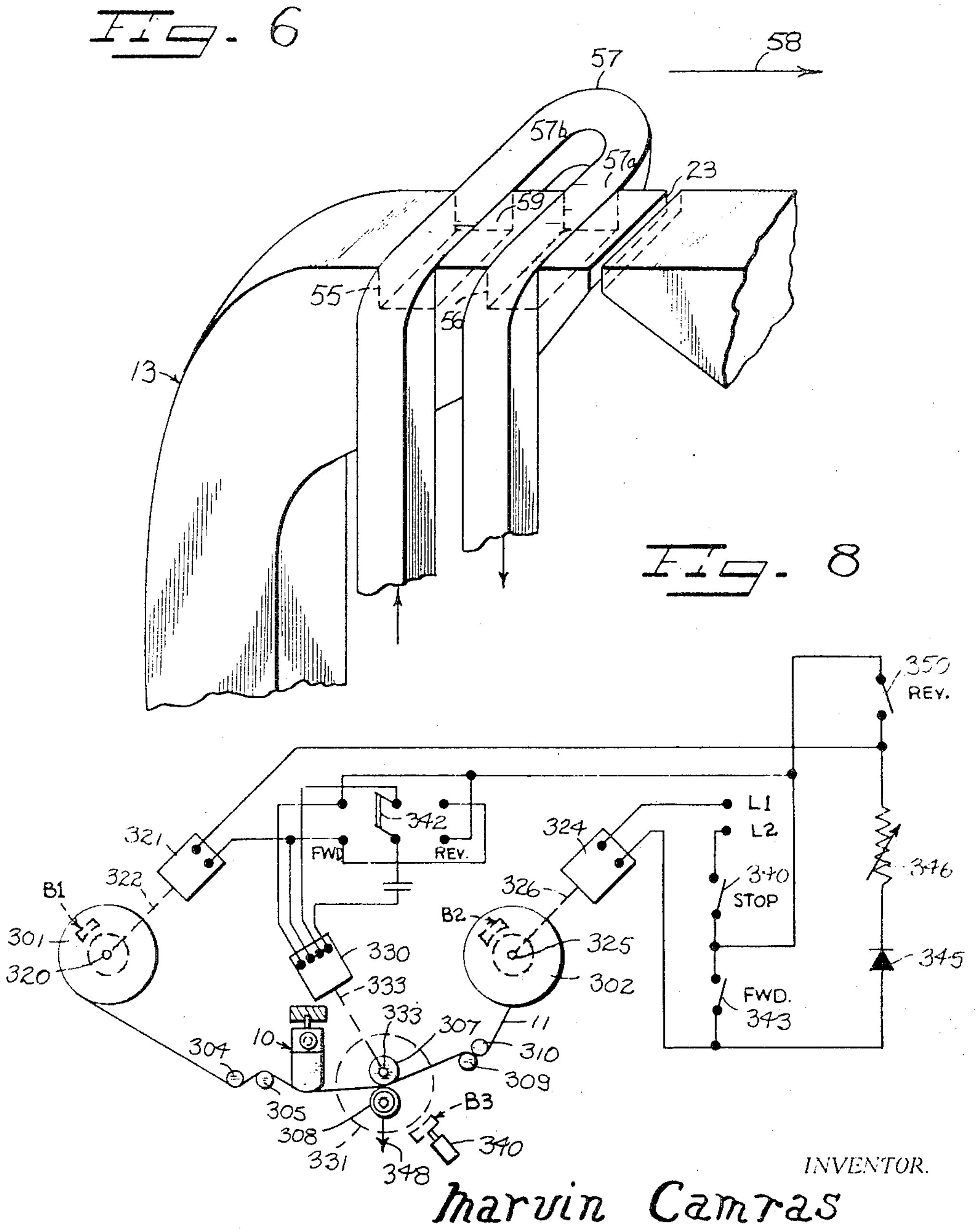
FIGURE 6 is an enlarged fragmentary view of an embodiment of the present invention showing another arrangement of biasing conductors for the head of FIGURE 1.
FIGURE 8 shows a tape transport system for the embodiments of FIGURES 1–7.

Alternately, the biasing conductors of the present invention may be constructed and arranged in a manner as shown in FIGURE 6. The magnetic core member 13 has located at each side of the recording gap 23 a pair of transverse slots 55 and 56. Inserted in slots 55 and 56 is a rectangular cross-sectioned conductor 57 arranged as shown in FIGURE 6. When a current is passed through the conductor 57 a magnetic field is produced about the conductor 57 in such a manner as to provide a cross field biasing effect in the region of recording gap 23. The magnetic cross field biasing which is produced in the region of the gap 23 is proportioned to the difference between the magnetic field produced by conductor portion 57*a* and the magnetic field produced by conductor portion 57*b*. That is, the magnetic field in the region of gap 23 in oersteds (H) is equal to $$H=\frac{0.4I}{R_1}-\frac{0.4I}{R_2}$$

where I is equal to the amount of current in amperes passing through the conductor portions 57*a* and 57*b* and $R_1$ and $R_2$ are the respective distances of the conductor portions 57*a* and 57*b* from the gap 23 in centimeters.

One of the primary advantages realized by the loop configuration of biasing conductor 57 is that a greater ratio of cross field M.M.F. to recording gap M.M.F. is obtainable. In certain practical configurations the recording gap M.M.F. would otherwise be too great. Another advantage is that the cross field falls off as $1/R^2$ instead of $1/R$, where the average distance R from conductors to gap is large. This gives a better cross field and reduces its erasing tendencies beyond the record gap.

The inverse square relation may be seen from:

$$H=\frac{.4\pi I}{R_1}-\frac{4\pi I}{R_2}=\frac{.4\pi R_2-.4\pi R_1}{R_1R_2}$$

$$=\frac{.4\pi(R_2-R_1)}{R_1R_2}$$

In a given head the spacing between the conductors is $R_2-R_1$ which is a fixed constant A. When $R_1$ and $R_2$ becomes large compared to their spacing they may each be replaced in the denominator by their average R. We then have $$H=\frac{.4\pi A}{R_2}$$

showing that H varies inversely with $R^2$. This compares with a single conductor where $$H=\frac{.4\pi I}{R}$$

Similarly if the conductors are looped back and forth *n* times, the field falls off as $1/R^n$.

Figure 3:
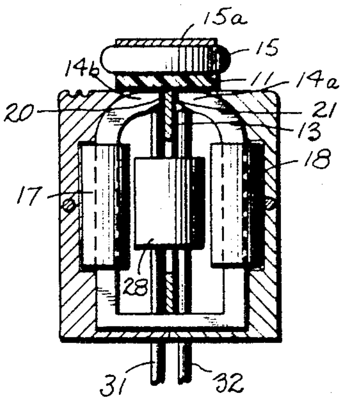
FIGURE 3 is a somewhat diagrammatic vertical sectional view of the embodiment of FIGURE 1.

In the above examples the core permeability is assumed infinite, so that the field about the conductors above the head is twice as great as if the core were absent. By way of example, the conductor portions 57*a* and 57*b* may each be 4 mils across, and the distance from gap 23 to conductor portion 57*a* may be 4 mils, the distance between conductor portions 57*a* and 57*b* also being 4 mils. Although the hairpin 57 is shown herein as being a rectangular cross section conductor it is not to be constructed in a limiting sense. By using a rectangular conductor, a greater cross sectional area is realized thereby allowing a larger current to flow in the conductor portions 57*a* and 57*b*. However, a circular or ribbon cross section conductor will work equally well. Also, the hairpin loop construction as shown in FIGURE 6 is not limited to use in recording video intelligence; it can work equally advantageously on the magnetic core 14, FIGURE 3, for the recording of audio intelligence. When high frequency biasing of audio intelligence is obtained in this manner, a greatly improved signal to noise ratio can be had biasing frequencies in the megacycle range being practical. In the preferred embodiment of the present invention the magnetic core member 13 may have located thereon slots and loop hairpins, similar to hairpin 57, on both sides of the recording gap 23. In this manner recording of video intelligence is obtainable on one track while the record medium moves in the direction of arrow 58 and then on another track while the record medium moves in the direction opposite to the direction of arrow 58.

Another advantage realized by the use of the multiple cross field conductors such as 57*a* and 57*b* is that the concentrated magnetic flux in the area 59, between conductor portions 57*a* and 57*b*, serves to erase a given channel of the record medium before it passes over the recording gap 23.

The net bias field produced by the conductor portions 57*a* and 57*b* is thus superimposed on the flux produced by the video coils 27 and 28 in the region of the record gap 23. Because of the very close proximity of the erase flux, in area 59, to the record gap 23 it will be noted that there is a semicircular field set up by the combined fields about conductor portions 57a and 57b which extends over into the region of the record gap 23. It can be seen therefore that the loop hairpin configuration shown in FIGURE 6 serves not only to erase the record medium just before recording thereon but also to provide an advantageous biasing field in the region of record gap 23.

Figure 2:
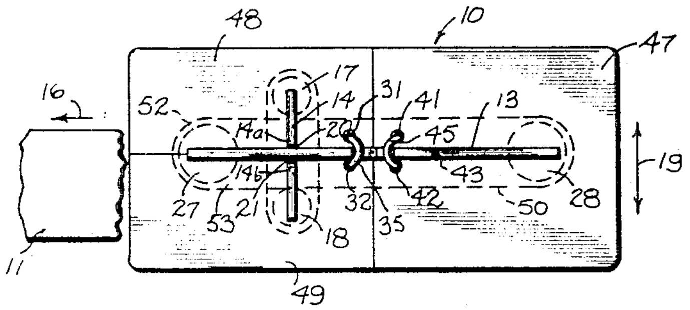
FIGURE 2 is a somewhat diagrammatic top plan view of the embodiment of FIGURE 1.

As shown in FIGURE 2, the outer casing member 12 can be constructed of three portions 47', 48 and 49. Case member 47' is provided with a cavity 50 to receive one end of the magnetic core pole piece 43 and coil 28, while the case members 48, 49 have symmetrical cavities 52 and 53 to receive the audio frequency magnetic core 14, audio coils 17 and 18, part of the video core 30 and video coil 27. Although the electromagnetic transducer head 10 has both audio and video recording sections and also provides a high frequency bias cross field, the construction is such as to allow the transducer head 10 to be of minimum physical dimensions.

Figure 4:
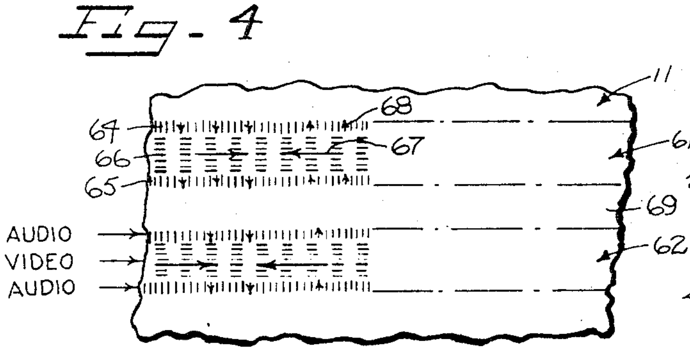
FIGURE 4 is a diagrammatic fragmentary plan view of a magnetic record tape and illustrates diagrammatically the recorded fields of a composite audio-video channel and the relationship of adjacent channels having such recorded fields.

FIGURE 4 illustrates a portion of the magnetic record medium 11, which in its entirety may be ¼ inch wide and form a 7 inch diameter reel of tape. The tape may have recorded thereon a series of ten channels two of which are indicated at 61 and 62. Channel 61 comprises two audio tracks 64 and 65 and one video track 66 between the audio tracks. The recorded fields of the video track 66 are directed longitudinally of the direction of movement of the record medium 60 as indicated by the arrow 67, while the recorded fields of the audio tracks 64 and 65 are preferably directed at right angles to the direction of travel of the record medium 60 as indicated by arrow 68. By way of example, the width of the audio tracks 64 and 65 may be 2 mils each, while the width of the video track 66 may be 15 mils, providing a total width of 19 mils for the tracks recorded on one channel of the record medium 11. The unused portion of the tape between adjacent channels such as 61 and 62 is represented by the blank area 69 and is 6 mils in width. With the dimensions mentioned hereinabove the center to center distance between tracks is .025 inch thereby providing ten channels on a ¼ inch tape. To obtain the necessary channels from the tape 11, the transducer head 10 is moved in the directions indicated by arrow 19, which is transverse to the direction of tape travel.

In order to produce a video track portion 66 having a width of about fifteen mils, the width of the magnetic pole pieces 30 and 43, FIGURE 5, and the transverse dimension of the gap 23 defined by the pole pieces should be approximately fifteen mils. The transverse gap, defined between poles 14a and 14b of audio core 14 and the adjacent portion of video core 13, should have a dimension at right angles to the direction of travel of the record medium of about two mils to provide audio tracks of two mils width as described in connection with FIGURE 1. The thickness dimension of the pole 14 which dimension is in the direction of tape travel is preferably selected to provide a null in response to recorded wavelengths corresponding to the horizontal sweep frequency of the video signal being recorded. Thus if $\lambda$ is the recorded wavelength on the record tape corresponding to the line frequency and $n$ is an integer, the effective thickness of the pole 14 in the direction of travel of the record medium should be $n\lambda$. This gives a null in the response of the head of FIGURE 1 in the audio circuit which tends to prevent interference between the audio and video signals on the tape. If the thickness of the pole 14 is represented by the letter W, the tape velocity by the letter V, and it is assumed that the line frequency is 15,750 cycles per second, then W equals $nV/15,750$.

The record tape 11 is driven in the direction of the arrow 16 across the transducer head of FIGURE 2 by any suitable tape transport mechanism. By way of example, if a ¼ inch wide tape of audio grade material is moved at a speed of 110 inches per second, with 20 tracks and a seven inch reel, the playing time will be between 40 and 120 minutes depending on the tape thickness. Picture quality will be improved further by proper use of microgap and cross field heads. Higher tape speeds are also feasible since the playing time is still adequate even when reduced by a factor of two or three.

The thickness dimension of the audio recording poles 14a and 14b in FIGURE 2 is selected to give a null in response at the line frequency so as to tend to prevent interference between the audio and video signals on the tape during playback. The audio circuit bias may be derived from the television receiver sweep circuits so as to avoid interference and eliminate the need for an oscillator. In the specific circuit illustrated, a capacitor can be used to tune the head windings 17 and 18 to resonance preferably at a harmonic of the sweep frequency, for example 47.25 kilocycles per second for a line frequency of 15,750 cycles per second; or to the fundamental frequency of 15,750 cycles per second.

The drive for the tape may comprise any suitable drive for translating the tape 11 first in the direction of the arrow 16 while one channel of the tape is being scanned and then for translating the tape in the opposite direction as an adjacent channel on the tape is scanned in the opposite direction and so forth. The head 10 is preferably shifted laterally, as indicated by arrow 19, between the scanning of the successive channels at successive reversals of the direction of drive of the tape 11 so that only a single head assembly is required. The tape drive preferably includes an automatic reversal system having switches actuated by means near the opposite ends of the tape 11 to initiate a reversal cycle. The actual reversal preferably automatically takes place during a vertical blanking interval so that it is not visible in the reproduced picture. The changeover is preferably controlled by the vertical synchronizing signal recorded on the tape. The reproduced vertical sync signal which causes tape reversal would be the one following actuation of the tape sensing switch. Each tape sensing switch may be actuated by electrical contact material adhered to the tape near one of the opposite ends thereof. An electronic gate circuit could be opened by a flip-flop circuit if placed in a "set" condition in response to actuation of a switch near one end of tape switch; the gate would then transmit the next reproduced vertical sync pulse to effect tape drive reversal. Instead of electrical contact material on the tape to signal the approach of an end of the tape, a special changeover signal may be recorded on the tape which when reproduced will be transmitted to the electronic flip-flop circuit to set the flip-flop.

In a single version the recorder can be reversed and moved to the next channel by manual control such as a pushbutton, in which case it is convenient to have a warning indicator to alert the operator of impending changeover. This can be a neon lamp voltage divider. Resistors Rx and Ry (not shown) are adjusted to give a voltage such as 75 volts which will not ignite the neon lamp but which will keep it on once ignited. When the tape conductive tab shorts out Rx the lamp has 150 volts (or more) across it, igniting it easily. The operator then has a minute for example, to choosen an opportune time for changeover. The light is extinguished whenever the changeover button is operated.

Suitable channel width erase heads may be provided at each side of the transducer head 10 and may be energized alternately in accordance with the direction of tape movement so as to insure an erased channel prior to recording regardless of the direction of tape movement. Such channel type erase heads would have a width of about twenty-three mils for the example given. An additional demagnetizing head of width to erase the entire tape could be provided for reducing the noise level between tracks. In the example given such an erase head would have a width of at least about 250 mils.

Figure 7:
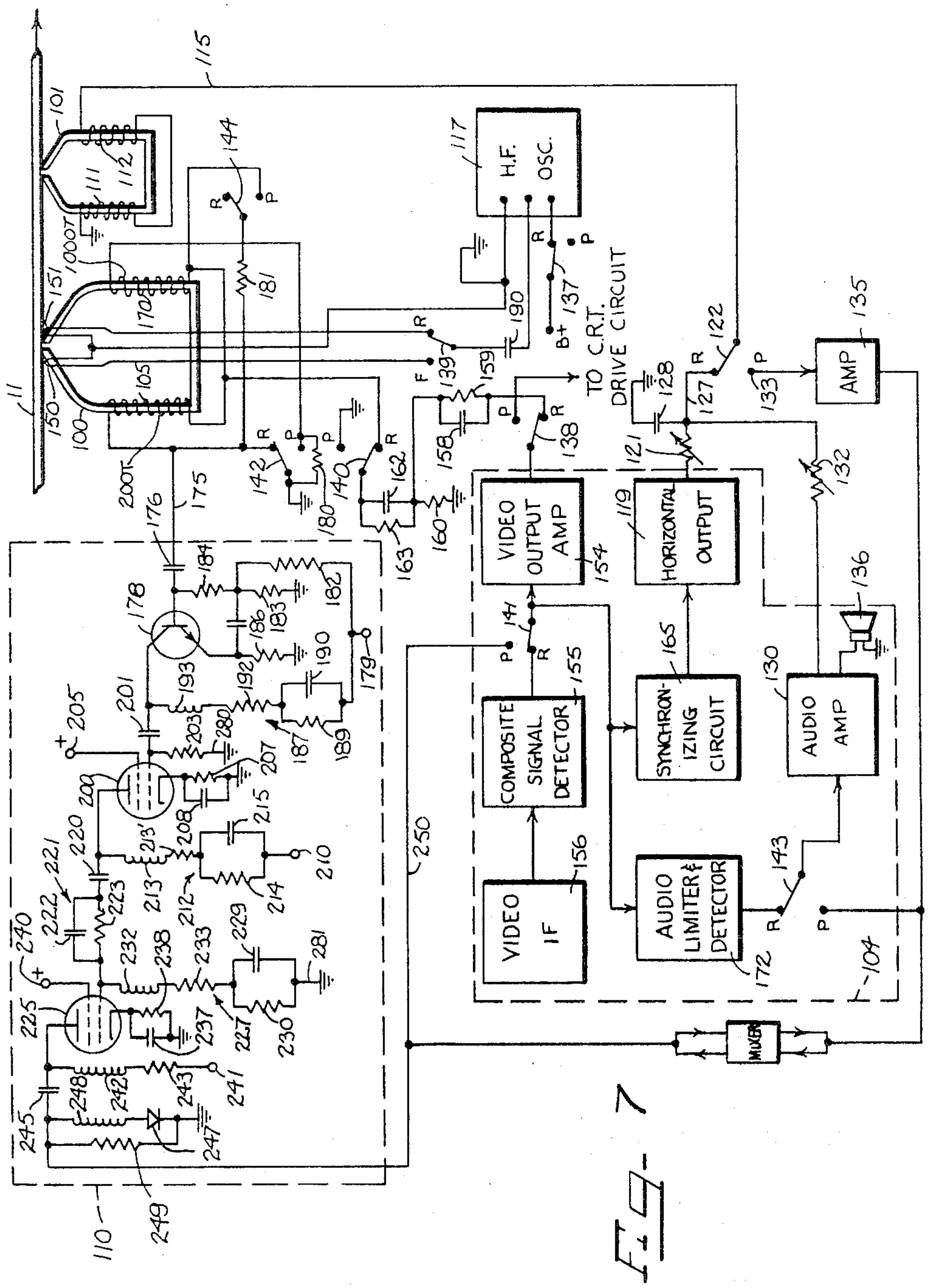
FIGURE 7 is a circuit diagram illustrating an audio-video recording and playback circuit for the electromagnetic transducer head of FIGURE 1.

FIGURE 7 is a circuit diagram illustrating an audio-video recording and playback circuit for use in conjunction with the transducer head 10 of FIGURE 1. As shown in FIGURE 7, the record medium 11 is moved across the transducer head, which is represented by the video magnetic core 100 and the audio magnetic core 101, to induce audio or video intelligence in appropriate signal coils during the playback operation, or to have the magnetic particles on the record medium 11 magnetized in response to magnetic fields produced by the signal coils during recording operation. A commercially available television set 104 is used to supply a video signal to coil 105. Also provided by the television set 104 is the audio signal which is applied to coils 111 and 112 of the audio magnetic core 101 through the line 115. The coils 111 and 112 are series aiding to provide the audio recorded pattern on the audio tracks shown in FIGURE 4. Providing the high frequency biasing signal to the magnetic core 100 is a high frequency oscillator 117. The oscillator 117 may have a fundamental frequency in the range between 3 and 15 megacycles per second, and preferably has an output whose fundamental and harmonic components will not interfere with the operation of the television set 104.

As illustrated in FIGURE 7, the high frequency bias for the audio signal is generated by the horizontal output circuit 119 of the television set 104. The high voltage sawtooth waveform of the television horizontal sweep generator transformer of circuit 119 is applied to audio coils 111 and 112 through resistor 121, selector switch 122 and line 115. The sawtooth waveform of the television sweep output circuit 119 has a frequency of 15,750 cycles per second, which is well above the usable audio frequency range of the commercially available television set 104. The resistor 121 provides for an adjustment of bias amplitude to the optimum level in accordance with known principles and also in conjunction with capacitor 128 shapes the bias waveform closer to a sine wave. The capacitor 128 in conjunction with the inductance of the audio coils 111 and 112 provides a tuned circuit which is preferably resonant at a harmonic of the sweep frequency, for example at the third harmonic or 47.25 kilocycles per second. As an alternative, the circuit comprising capacitor 128 and windings 111 and 112 may be tuned to the fundamental frequency which under present standards is 15,750 cycles per second. As a further alternative, a series of pulses may be applied to the windings 111 and 112 of a constant amplitude and of a relatively high frequency substantially above the audio range to provide the bias signal. In any event a high frequency bias signal may be superimposed on the audio signal from the amplifier stage 130 of television set 104. The output of the audio amplifier stage 130 is connected to the coils 111 and 112 through variable resistor 132, switch 122 and line 115. During the playback operation of the recording system, switch 122 is actuated and makes contact with the contact 133, thereby providing an audio playback signal through an auxiliary audio amplifier 135 to the audio circuit of the television receiver 104 including speaker 136.

For purposes of illustration, the selector switches 122, 137, 138, 140, 141, 142, 143 and 144 are shown in the record position and may either be separately actuated or preferably ganged together for simultaneous actuation. The high frequency bias conductors 150 and 151 are selectively connected to the high frequency oscillator 117 by means of forward and reverse switch 139. The high frequency bias signal is removed from the video transducer head core 100 during playback operation by means of switch 137.

The video intelligence applied to the video winding 105 of core 100 is obtained from a video output amplifier 154 of receiver 104 which in turn has its input connected to a composite signal detector 155. The signal received by the television set is amplified by a video intermediate frequency amplifier stage 156 in the television receiver 104. The video output from amplifier 154 is applied to a basic correcting network comprising capacitor 158 and resistor 159 and through a resistor 160. The voltage developed across resistor 160 is applied to a correcting network comprising capacitor 162 and resistor 163. After the video intelligence has passed through the correcting networks, it is applied to coil 105 through switch 140 to produce a video frequency magnetic field in the path of the record medium 11.

The synchronizing circuit 165 located inside the television receiver 104 will provide the necessary horizontal synchronizing signals for the horizontal output stage 119.

The video output amplifier 154 transmits the vertical and horizontal synchronizing signals which are received from the composite signal detector 155 so that the synchronizing signals are recorded on the video track by the video core 100. In this manner the television receiver 104 can then again be synchronized during playback to obtain a steady video reproduction on the television receiver 104.

During the playback operation of the audio-video recording system, all the selector switches are placed in the playback position indicated by the letter P in FIGURE 7. This action will remove the high frequency bias from conductors 150 and 151. Also during the playback operation the video amplifier 154 is disconnected from coil 105, and coil 170 is connected in series with the coil 105. Coil 170 is resonant at a lower frequency than coil 105.

As the record medium 11 moves over the transducer head during playback the audio signal received from the record medium is transmitted by coils 111 and 112 to the standard audio amplifier 135 and then to the audio amplifier stage 130 of the television receiver 104. However, the video portion of the playback signal in coils 105 and 170 is coupled to the amplifier 110 whose output is in turn connected to video output amplifier 154 and synchronizing circuit 165 of the television set 104.

The audio intermediate frequency amplifier and discriminator component 172 serves to supply an audio frequency input to amplifier 130 during recording, but is not utilized for playback in the illustrated embodiment.

The video playback amplifier 110, shown in FIGURE 7, illustrates a preferred circuit for use in cooperation with the transducer head represented by cores 100 and 101. In this circuit, video intelligence from the coils 105 and 170 in series is applied through a line 175 and capacitor 176 to the base electrode of transistor 178, which is the first stage of the wide band video amplifier 110. A low B+ voltage is connected to a terminal 179 and a portion thereof is applied to the base electrode of transistor 178 through the voltage divider network comprising resistors 182, 183 and 184. The low B+ voltage from terminal 179 is also applied to the collector electrode of transistor 178 through equalizing circuit 187, which comprises a parallel network consisting of a resistor 189 and a capacitor 190 connected to a series circuit consisting of a resistor 192 and an inductor 193. The output of transistor 178 is then applied to the grid electrode of tetrode tube 200 through capacitor 201. A resistor 203 is connected between the grid electrode of tube 200 and ground. The screen grid of tetrode 200 has applied thereto a substantially higher voltage through a terminal 205; however, the voltage applied to the screen grid is preferably lower than the plate voltage of tetrode 200. A biasing network comprising a resistor 207 and a capacitor 208 in parallel is connected in the cathode circuit of tetrode 200. The high voltage for the plate electrode of tetrode 200 is obtained from terminal 210. The terminal 210 is connected to tube 200 through an equalizing circuit 212 consisting of an inductor 213, a series resistor 213' and a parallel resistor 214 and capacitor 215.

The output from the second stage of amplification is then applied through capacitor 220 and through network 221 which comprises a capacitor 222 and resistor 223, to the grid electrode of tetrode 225. The grid electrode of tetrode 225 has connected thereto an equalizing circuit 227, which comprises a parallel combination of capacitor 229 and resistor 230 and a series combination of inductor 232 and resistor 233. A biasing network which comprises a parallel combination of capacitor 237 and resistor 238 is connected between the cathode of tetrode 225 and ground. Connected to the screen electrode of tetrode 225 is a reduced B+ voltage through terminal 240. The B+ voltage applied to the plate electrode of tetrode 225 is obtained from terminal 241 which connects with tetrode 225 through inductor 242 and resistor 243 in series.

The output from the third and final stage of amplification of the video amplifier 110 is applied through capacitor 245 and to a diode 247 and inductor 248 in series and to a resistor 249 shunting the diode and inductor. The output from this shunt arrangement is coupled to the video input of the television receiver 104 by line 250 and switch 141.

Although the first stage of amplification of the video amplifier 110 is shown herein as a transistorized circuit, it will be understood that a vacuum tube amplifier can be used equally well. In the preferred embodiment of the present invention, the first stage transistorized amplifier has component valeus as follows:

| Component: | | Component value |
|---|---|---|
| Capacitor 176 | microfarads | .15 |
| Capacitor 201 | do | .05 |
| Capacitor 190 | do | .02 |
| Resistor 184 | ohms | 10K |
| Resistor 183 | do | 10K |
| Resistor 182 | do | 150K |
| Inductor 193 | microhenries | 250 |
| Resistor 192 | ohms | 3.3K |
| Resistor 189 | do | 18K |

FIGURE 8 illustrates a particularly low cost tape transport system for the video recorder of the present invention. In the illustrated embodiment, the record medium 11 travels from a supply reel 301 to a take-up reel 302. The tape path between the reels is past tape guides 304 and 305, past the transducer head 13, between a capstan 307 and pinch roller 308 and past tape guides 309 and 310. The supply spindle 320 is preferably driven by an induction motor 321, the mechanical coupling between the motor and the spindle 320 being indicated at 322. Similarly an induction motor 324 is preferably coupled to the take-up spindle 325 by means diagrammatically indicated at 326. A reversible motor 330 preferably has the capstan 307 and capstan flywheel 331 directly on its shaft indicated at 333.

Brake means are indicated at $B_1$ and $B_2$ for supplying a braking force to the supply and take-up spindles 320 and 325. The brake shoes such as diagrammatically indicated at $B_1$ and $B_2$ may act on brake disks secured to the shafts 320 and 325, for example. A brake for the capstan motor 330 is indicated at $B_3$, and preferably the brake $B_3$ is automatically applied, for example by means of a compression spring when the capstan motor is deenergized, the brake being automatically released, for example by means of solenoid 340 upon energization of the capstan motor in either direction of operation.

The system is operated in the forward direction by placing the double pole, double throw reversing switch means 342 in its left hand forward position as viewed in FIGURE 8 and by closing the forward switch 343. Under these conditions, the capstan motor 330 is energized to drive the capstan 307 in a counterclockwise direction of rotation so as to move the record medium 11 at constant speed from the supply reel 301 to the take-up reel 302. The take-up motor 324 is energized to drive the reel 302 in the counterclockwise direction so as to wind the tape 11 on the reel 302 as it is delivered thereto from the capstan 307. The supply motor 321 receives a unidirectional current from alternating current supply lines L1 and L2 through rectifier 345 and resistor 346. The direct current energization of the motor 321 is in such a direction as to provide a drag tending to resist rotation of the supply reel 301 in the counterclockwise direction.

In the illustrated embodiment, when a stop button is depressed, the stop switch 340 and forward switch 343 are opened, brakes $B_1$, $B_2$ and $B_3$ are applied, and the pinch roll 308 is shifted in the direction of arrow 348 to disengage the tape 11 from the capstan 307.

When a reverse button is actuated, switches 340 and 350 may be closed, and reversing switch 342 placed in the right hand position. At the same time, brakes $B_1$, $B_2$ and $B_3$ are released and the pinch roll 308 is actuated to engage the tape 11 with the capstan 307. The supply motor 321 is now energized with alternating current through reversing switch 350 to drive the reel 301 in the clockwise direction, while the capstan 307 is also driven by motor 330 in the clockwise direction so as to feed the tape 11 at uniform speed past the transducer head 13. The motor 324 is energized with direct current under the control of rectifier 345 and resistor 346 so as to resist rotation of the take-up reel 302 in the clockwise direction.

It has been found that tape motion is actually steadier when the tape is driven in such a direction that the capstan 307 precedes the head 13, as compared to the normal arrangement where the capstan pulls the tape past the transducer head. It is found that a half wave silicon rectifier such as indicated at 345 furnishing 150 to 300 milliamperes gives a smooth drag even without filtering and without any overheating of the motor. Filtering can be added, if desired, however.

In the pushbutton operation described, only one operating button can be pressed at a time, and must be reset by the stop button before a further button can be depressed. The stop button engages brakes $B_1$, $B_2$, $B_3$ and releases the pinch roll 308. The head is shifted to the next channel each time the motion of the tape 11 is reversed. Thus in the illustrated system, the head is indexed to channel 2 at the completion of the forward motion of the tape, to channel 3 at the end of reverse motion of the tape and so forth. After the tenth channel has been played, the tape 11 is fully wound on the supply reel 301, and the head 13 may be turned to its initial position for engagement with channel No. 1 of a succeeding tape. The resistor 346 serves to provide an adjustment for the tension of the tape between the reel from which the tape is being unwound and the capstan. The guides 304, 305, 309 and 310 may have grooves therein with a dimension substantially corresponding to the width of the tape 11, i.e. ¼ inch, so as to determine accurately the position of the tape for each position of the head 13. As illustrated in FIGURE 2, the head assembly 10 may have a tape contacting surface of sufficient width so that the tape 11 is supported in each of the ten positions of the head corresponding to scanning of the ten channels on the tape 11. A channel indicator may be coupled with the transducer head 13 so as to indicate the channel being scanned by the transducer head.

I claim as my invention:

1. A transducer system comprising: a magnetic head having a first winding with a relatively large number of turns and a first relatively low resonance frequency and having a second winding with a relatively low number of turns and a second relatively higher resonance frequency, recording mode input means for supplying a signal to the head for recording thereby during a recording mode, playback mode output means for receiving a signal from the head during a playback mode, and switching means for connecting one only of said first and second windings to said recording mode input means during the recording mode and for connecting both of said first and second windings to said playback mode output means during the playback mode.

2. A transducer system comprising a transducer head for coupling to a magnetic record medium, said head having a first winding with a relatively large number of turns and a second winding with a smaller number of turns, a playback circuit having input terminal means for coupling to the head during playback, a recording circuit having output terminal means for coupling to the head during recording, said recording circuit including resistance means, and means for connecting said first and second windings in series to said input terminal means during playback operation and for connecting said second winding to said output terminal means and for connecting said resistance means across said first winding during recording operation.

References Cited

UNITED STATES PATENTS

| | | | |
|---|---|---|---|
| 2,468,198 | 4/1949 | Heller | 179—100.2 |
| 3,159,822 | 12/1964 | Hagopian | 346—74 |

BERNARD KONICK, Primary Examiner

J. R. GOUDEAU, Assistant Examiner

U.S. Cl. X.R.

178—6.6; 242—55.12